US010882520B2

(12) United States Patent
Johnson

(10) Patent No.: US 10,882,520 B2
(45) Date of Patent: Jan. 5, 2021

(54) SYSTEM AND METHOD FOR ENABLING SAFETY OF A VEHICLE

(71) Applicant: HCL America Inc, Sunnyvale, CA (US)

(72) Inventor: Morris Stanley Johnson, Cary, CT (US)

(73) Assignee: HCL America Inc, Sunnyvale, CA (US)

( * ) Notice: Subject to any disclaimer, the term of this patent is extended or adjusted under 35 U.S.C. 154(b) by 0 days.

(21) Appl. No.: 16/226,725

(22) Filed: Dec. 20, 2018

(65) Prior Publication Data

US 2020/0198629 A1  Jun. 25, 2020

(51) Int. Cl.
 *B60Q 1/26* (2006.01)
 *B60W 30/095* (2012.01)
 *G08G 1/16* (2006.01)
 *G08G 1/052* (2006.01)
 *G05D 1/02* (2020.01)

(52) U.S. Cl.
 CPC .... *B60W 30/0953* (2013.01); *B60W 30/0956* (2013.01); *G08G 1/052* (2013.01); *G08G 1/161* (2013.01); *G08G 1/166* (2013.01); *G05D 1/0289* (2013.01)

(58) Field of Classification Search
 CPC ............. B60W 30/08; B60W 30/0953; B60W 30/0956; G08G 1/052; G08G 1/161; G08G 1/166; G05D 1/0289
 See application file for complete search history.

(56) References Cited

U.S. PATENT DOCUMENTS

| 7,295,925 | B2 * | 11/2007 | Breed | G01S 17/86 701/301 |
| 2010/0214085 | A1 | 8/2010 | Avery et al. | |
| 2013/0325306 | A1 | 12/2013 | Caveney et al. | |
| 2014/0282093 | A1 * | 9/2014 | Burke | H04W 4/18 715/753 |
| 2015/0336502 | A1 * | 11/2015 | Hillis | G06F 3/017 701/23 |
| 2016/0267796 | A1 * | 9/2016 | Hiroma | H04L 51/20 |
| 2017/0248949 | A1 * | 8/2017 | Moran | G08G 1/165 |

FOREIGN PATENT DOCUMENTS

DE 102015210781 A1 12/2016
DE 102017200871 A1 7/2018

* cited by examiner

*Primary Examiner* — Hunter B Lonsberry
*Assistant Examiner* — Daniel M. Robert
(74) *Attorney, Agent, or Firm* — HM Law Group LLP; Vani Moodley, Esq.

(57) ABSTRACT

A system(s) and method(s) for enabling safety of a vehicle is disclosed. The method comprises identifying one or more secondary vehicles in the vicinity of a vehicle and transmitting one or more potential safety responses to the one or more secondary vehicles. Further, the method comprises receiving response data from the one or more secondary vehicles based on the one or more potential safety responses, wherein the response data comprises one of an OK response or a NOT OK response corresponding to each of the one or more potential safety responses. Furthermore, the method comprises identifying one or more optimal responses based on filtering of the one or more potential safety responses using the response data and executing the optimal responses if the event occurs, thereby enabling vehicle safety.

8 Claims, 3 Drawing Sheets

SYSTEM AND METHOD FOR ENABLING SAFETY OF A VEHICLE

CROSS-REFERENCE TO RELATED APPLICATIONS AND PRIORITY

The present application does not claim priority from any patent application.

TECHNICAL FIELD

The present disclosure in general relates to the field of autonomous and semi-autonomous Vehicle. More particularly, the present subject matter relates to a system and a method for enabling safety of a vehicle.

BACKGROUND

Nowadays, autonomous vehicles aka (driver-less cars) are being developed and utilized heavily and many major companies have their own autonomous vehicles in design or production. Moreover, most major car companies already have semi-autonomous features in most of the vehicles that allow hands-free driving, predictive emergency braking and the like. Typically, all conventional autonomous systems are rule based, taking input from the environment via sensors—presence of other vehicles, pedestrians, road obstacles and animals. Further the conventional autonomous system also have rules of what to do when the car needs to respond to an unexpected event, emergency driving, or other incursion (animal, object on road, vehicles coming into its lane, etc.). One of the conventional art describes a system where the semi-autonomous features engage at the time of a real event, but this is not optimal as each vehicle has 1 or 2 seconds to react and each reaction could cause another dangerous situation for another vehicle. One other problem is that the conventional systems are proprietary for each car maker and are configured to handle what that single vehicle is designed to do, but in real world conditions there are more than one vehicle on the road. Typically, car makers don't want to share their trade secrets related to how their accident avoidance systems work, thereby limiting communication between vehicles on the road. On more problem in the conventional art.

SUMMARY

Before the present system and a method for enabling safety of a vehicle are described, it is to be understood that this application is not limited to a particular system, systems, and methodologies described, as there can be multiple possible embodiments, which are not expressly illustrated in the present disclosures. It is also to be understood that the terminology used in the description is for the purpose of describing the particular implementations, versions, or embodiments only, and is not intended to limit the scope of the present application. This summary is provided to introduce aspects related to a system and a method for enabling safety of a vehicle. This summary is not intended to identify essential features of the claimed subject matter nor is it intended for use in determining or limiting the scope of the claimed subject matter.

In one embodiment, a method for enabling safety of a vehicle is disclosed. In the embodiment, the method comprises identifying one or more secondary vehicles in the vicinity of a vehicle and transmitting one or more safety responses to the one or more secondary vehicles. In one example, the one or more safety response is indicative of a response by the vehicle on occurrence of an event. The method further comprises receiving response data from the one or more secondary vehicles based on the one or more safety responses and identifying one or more optimal responses based on filtering of the one or more safety responses using the response data. In one example, the response data comprises one of an OK response or a NOT OK response corresponding to each of the one or more safety response. The method furthermore comprises executing one of the optimal responses if the event occurs, thereby by enabling vehicle safety.

Based on the description above, there is at least need of a way to use the knowledge of what each vehicle would do for a given event that could occur on the roadway, before the event occurs; then share that information with vehicles nearby and have the group of nearby vehicles provide feedback to each other about what maneuvers would be safe to attempt if needed.

In one embodiment, a system for enabling safety of a vehicle is disclosed. The system comprises a memory and a processor coupled to the memory, further the processor may be configured to execute programmed instructions stored in the memory. In the embodiment, the system may identify one or more secondary vehicles in the vicinity of a vehicle and transmit one or more safety responses to the one or more secondary vehicles. In on example, the one or more safety response may be indicative of a response by the vehicle on occurrence of an event. Upon transmitting, the system may receive response data from the one or more secondary vehicles based on the one or more safety responses and identify one or more optimal responses based on filtering of the one or more safety responses using the response data. In one example, the response data may comprise one of an OK response or a NOT OK response corresponding to each of the one or more safety response. Further to identifying, the system may execute, by the processor, one of the optimal responses if the event occurs, thereby by enabling vehicle safety.

BRIEF DESCRIPTION OF DRAWINGS

The foregoing detailed description of embodiments is better understood when read in conjunction with the appended drawings. For the purpose of illustrating the present subject matter, an example of construction of the present subject matter is provided as figures; however, the present subject matter is not limited to the specific method and system disclosed in the document and the figures.

The present subject matter is described in detail with reference to the accompanying figures. In the figures, the left-most digit(s) of a reference number identifies the figure in which the reference number first appears. The same numbers are used throughout the drawings to refer various features of the present subject matter.

DETAILED DESCRIPTION

Some embodiments of this disclosure, illustrating all its features, will now be discussed in detail. The words "comprising," "having," "containing," and "including," and other forms thereof, are intended to be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any system and method for enabling safety of a vehicle, similar or equivalent to those described herein can be used in the practice or testing of embodiments of the present disclosure, the exemplary, system and method for enabling safety of a vehicle are now described.

Various modifications to the embodiment will be readily apparent to those skilled in the art and the generic principles herein may be applied to other embodiments for enabling safety of a vehicle. However, one of ordinary skill in the art will readily recognize that the present disclosure for enabling safety of a vehicle is not intended to be limited to the embodiments described, but is to be accorded the widest scope consistent with the principles and features described herein.

In one embodiment, what is being disclosed is a way to use information from nearby vehicle autonomous or semi-autonomous systems, combined with wireless communication between vehicles to test scenarios of potential events, share the "response action" for an event, and validate if other nearby vehicles can tolerate the response action.

In another embodiment, a system and method for enabling safety of a vehicle is disclosed. In one embodiment, one or more secondary vehicles in the vicinity of a vehicle may be identified. Upon identification, one or more safety responses may be transmitted to the one or more secondary vehicles. In one example, the one or more safety response may be indicative of a response by the vehicle on occurrence of an event. Further to transmitting, a response data may be received from the one or more secondary vehicles based on the one or more safety responses. In one example, the response data may comprise one of an OK response or a NOT OK response corresponding to each of the one or more safety response. Subsequent to receiving one or more optimal responses may be identified based on filtering of the one or more safety responses using the response data and the optimal response may be executed if the event occurs, thereby by enabling vehicle safety.

Exemplary embodiments for a vehicle body side structure discussed above may provide certain advantages. Further, in the subsequent description, embodiments of the present subject along with the advantages are explained in detail with reference to the FIG. 1 to FIG. 3.

Figure 1:
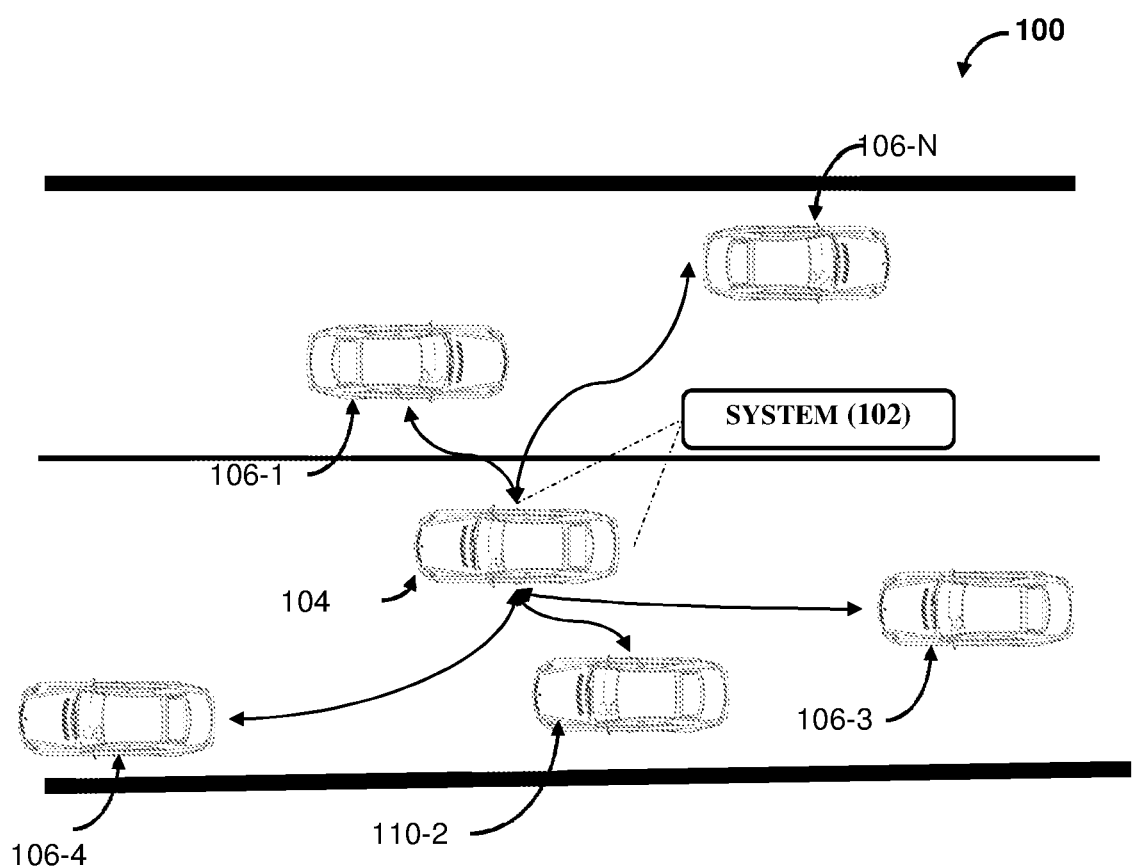
FIG. 1 illustrates a network implementation of a system for enabling safety of a vehicle, in accordance with an embodiment of the present subject matter.

Referring now to FIG. 1, multiple embodiment of a network implementation 100 of a system 102 for enabling safety of a vehicle is disclosed. Although the present subject matter is explained considering that the system 102 is implemented on a primary vehicle 104, it may be understood that the system 102 may also be implemented in a variety of computing systems, such as a laptop computer, a desktop computer, a notebook, a workstation, a mainframe computer, a server, a network server, and the like. In one implementation, the system 102 may be implemented in a cloud-based environment. It will be understood that multiple users may access the system 102 through one or more user device or applications residing on the user device. Examples of the user device may include, but are not limited to, a portable computer, a personal digital assistant, a handheld system, and a workstation. The system 102 may be communicatively coupled to other system 102 located in one or more secondary vehicles in the vicinity of the primary vehicle 104 server 110 through a network 106.

In one implementation, the network 106 may be a wireless network, a wired network or a combination thereof. The network 106 may be implemented as one of the different types of networks, such as intranet, local area network (LAN), wide area network (WAN), the internet, and the like. The network 106 may be either a dedicated network or a shared network. The shared network represents an association of the different types of networks that use a variety of protocols, for example, Hypertext Transfer Protocol (HTTP), Hypertext Transfer Protocol Secure (HTTPS), Secure File Transfer Protocol (SFTP), Transmission Control Protocol/Internet Protocol (TCP/IP), Wireless Application Protocol (WAP), and the like, to communicate with one another.

In the embodiment, the system 102, may identify one or more secondary vehicles 106 in the vicinity of a vehicle 104 and transmit one or more safety responses to the one or more secondary vehicles 106. In one example, the one or more safety response may be understood as a response by the vehicle 104 on occurrence of an event, such as a tire blow out. Further to transmitting, the system 102 may receive response data from the one or more secondary vehicles 106 based on the one or more safety responses. In one embodiment, the response data may comprise one of an OK response or a NOT OK response corresponding to each of the one or more safety response. Upon receiving the system 102 may identify one or more optimal responses based on filtering of the one or more safety responses using the response data and execute the optimal response if the event occurs, thereby by enabling vehicle safety.

Figure 2:
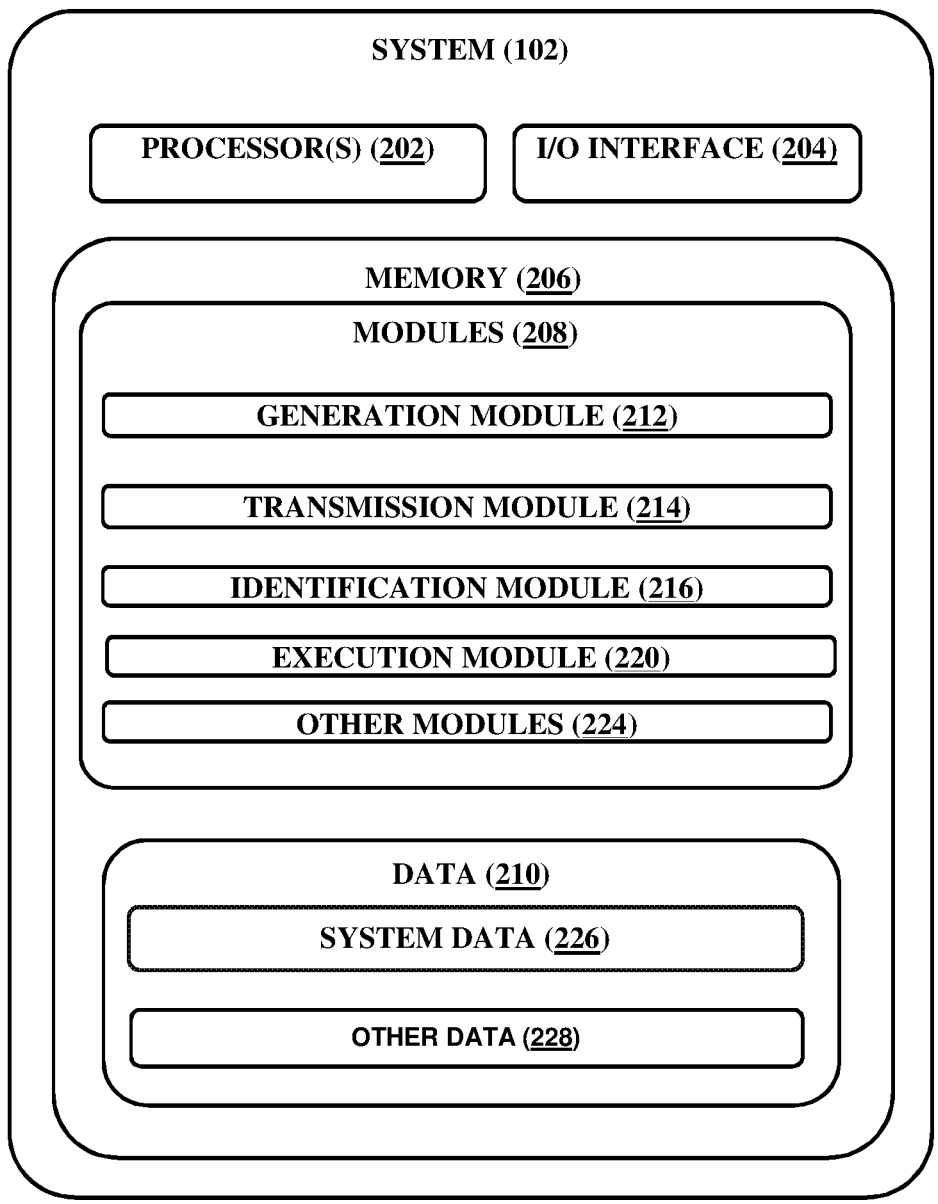
FIG. 2 illustrates and embodiment of the system for enabling safety of a vehicle, in accordance with an embodiment of the present subject matter.

Referring now to FIG. 2, an embodiment of the system 102 for enabling safety of a vehicle is illustrated in accordance with the present subject matter. The system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any systems that manipulate signals based on operational instructions. Among other capabilities, at least one processor 202 may be configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with the user directly or through the user device 104. Further, the I/O interface 204 may enable the system 102 to communicate with other computing systems, such as web servers and external data servers (not shown). The I/O interface 204 may facilitate multiple communications within a wide variety of networks and protocol types, including wired networks, for example, LAN, cable, etc., and wireless networks, such as WLAN, cellular, or satellite. The I/O interface 204 may include one or more ports for connecting a number of systems to one another or to another server.

The memory 206 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 210.

The modules 208 may include routines, programs, objects, components, data structures, and the like, which perform particular tasks, functions or implement particular abstract data types. In one implementation, the module 208 may include a generation module 212, a transmission module 214, an identification module 216, am execution module 220, and other modules 224. The other modules 224 may include programs or coded instructions that supplement applications and functions of the system 102.

The data 210, amongst other things, serve as a repository for storing data processed, received, and generated by one or more of the modules 208. The data 210 may also include a system data 226, and other data 228. In one embodiment, the other data 228 may include data generated as a result of the execution of one or more modules in the other module 224.

In one implementation, a user may access the system 102 via the I/O interface 204. The user may be registered using the I/O interface 204 in order to use the system 102. In one aspect, the user may access the I/O interface 204 of the system 102 for obtaining information, providing inputs, configuring or implementing the system 102.

Generation Module 212

Initially, the generation module 212 may obtain data from one or more devices. In one example, the data comprises environmental data such as temperature, wind speed, video of the surrounding, vehicle data such as rpm/speed of the engine, passenger data such as number of passengers, road data such as width of road. Further, the devices comprise one or more of sensors and cameras. Upon obtaining data, the generation module 212 may predict an occurrence of the event based on the data, for example, based on analysis of the data the generation module may identify a man on the side of a road and predict an event of the man crossing the road. Further, the generation module 212 may generate the one or more safety response to the event, based on a set of predefined rules, for example, apply emergency brakes, take a left turn, and take a right turn. In one example, the one or more safety response may be indicative of a response by the vehicle on occurrence of an event;

In one embodiment, the generation module 212 may generate an execution probability associated with the one or more safety response based on the data, for example, as there is high traffic on the right and medium on the left the execution probability for apply emergency brakes is 0.8, take a left turn is 0.5, and take a right turn 0.2. In example, the execution probability may be indicative of a likelihood that the safety response would be executed if the event actually occurs. Furthermore the generation module 212 may filter the one or more safety response based on the execution probability.

In one embodiment, the generation module 212 may store the data, responses, events, and execution probability in system data 226. In one embodiment, in absence of data, the generation module 212 may obtain a pre-stored events and associated responses.

Transmission Module 214

Further, in the embodiment, the transmission module 214 identify one or more secondary vehicles in the vicinity of a vehicle and transmit the one or more safety responses to the one or more secondary vehicles for example, apply emergency brakes, take a left turn, and take a right turn. In one other embodiment, the transmission module 214 transmit the one or more safety response filtered based execution probability with the execution probability to the secondary vehicles.

Identification Module 216

Furthermore, in the embodiment, the identification module 216 may receive response data from the one or more secondary vehicles based on the one or more potential safety responses. Further, the identification module 216 may compute a total number of OK response and NOT OK response received for each of the one or more safety response. In one example, the identification module 216 filter the one or more safety response based on the execution probability and a predefined threshold probability. Upon computing, the identification module 216 may identify one or more optimal responses based on filtering of the one or more safety responses using the response data. In one example, the response data comprises one of an OK response or a NOT OK response corresponding to each of the one or more safety response. In one other example, response data may also comprise a reason for OK response or NOT OK response. In another ether example, optimal responses may be one or more of a) the one or more safety response with a maximum number of OK response or minimum number of NOT OK response, b) the one or more safety response with OK response above a predefined threshold or NOT OK response below a predefined threshold.

Execution Module 218

In the embodiment, the execution module 218, executes the optimal response if the event occurs, thereby enabling vehicle safety. In other embodiment the execution module 218, may execute an adjustment of the vehicle based on the reason for NOT OK response and the execution probability, and re-perform the above described subject matter for converting a NOT OK response to an OK response.

In one other example implementation of the present subject matter construe a scenario where each car (alternatively referred to as vehicles) 104, 106 will have a control module containing a communication system, interface to on-board autonomous/semi-autonomous/crash avoidance system, an sub-module to simulate events and retrieve responses via the interface, a sub-module to validate "response data" from other cars are OK/Not OK, storage to keep track of response data (OK/NOT OK).

Each vehicle has a series of response actions based inputs from the environment. How these systems determine what is around them, what is a threat, and their responses to the threat are all a proprietary part of the autonomous/semi-autonomous on-board systems. Each autonomous and semi-autonomous vehicle will have a scenario/simulation mode which is looking at the environment around them and based on their own proprietary response rules.

In the example, the system 102 anticipates events based on what is nearby (cars, people, animals, etc.). Further, the system 102 analyses each event and generates one or more potential safety responses for each event. For example:
If X event happens, this car will do Y.
 If I have rear tire blow out, I will move to the right median immediately
 If I get a malfunction event (transmission problem, overheating, etc.), I will slow to 25 mph within 20 secs, and moved to the closest median)
 If the deer runs across the road, maximum braking down to 0 mph.

If vehicle in front of me stops suddenly, I will brake to 0 within 5 secs

All nearby cars (secondary cars 106) form a network (ad-hoc) to allow communication with one another. Each car in the network sends a list of potential safety responses to other vehicles in the network. Each car in the network replies to the sender (primary car 104) of the one or more potential safety responses if they are Ok with each of the potential safety response. When a car (secondary car 106) is asked if it's OK with a one or more potential safety responses from another vehicle, the car compares its position on the road, its capabilities to avoid accidents, and other on-board safety systems to answer—OK or Not OK. This is done for each car in the network and is repeated continuously as long as the cars continue to be nearby and in the ad-hoc network. If all cars respond OK to all or at least one potential safety response, then a safe state (optimal response) exists, which may be executed on occurrence of the event, among the group of vehicles.

Additionally, in another embodiment of the example, cars could send probabilities of having to make a particular response action (higher chance car will need to stop suddenly during rush hour versus a rapid lane change). In this case the higher probability response actions could be considered more important to the group of networked vehicles. So the question then becomes "am I OK with most likely things the car next to me might do." In another embodiment of the example, if a vehicle determines a potential response from another vehicle as Not OK, the vehicle can calculate and make an adjustment such that it could change its answer to OK. (i.e. change speed, change lanes, etc.). This is useful if it continues to report "Not OK" for the same actions over several cycles. In another embodiment of the example, if the system has several vehicles responding Not OK to actions, but a real event occurs, the car responding to the event can select the evasive action that would negatively impact the fewest number of vehicles.

Exemplary embodiments for enabling safety of a vehicle discussed above may provide certain advantages. Though not required to practice aspects of the disclosure, these advantages, without limitation, are the following. Some embodiments of the system and the method enable communication between autonomous vehicles of different manufactures. Some embodiments of the system and the method improved safety of autonomous vehicles. Some embodiments of the system and the method reduce the time require for decision making by an autonomous vehicle in emergency conditions.

Figure 3:
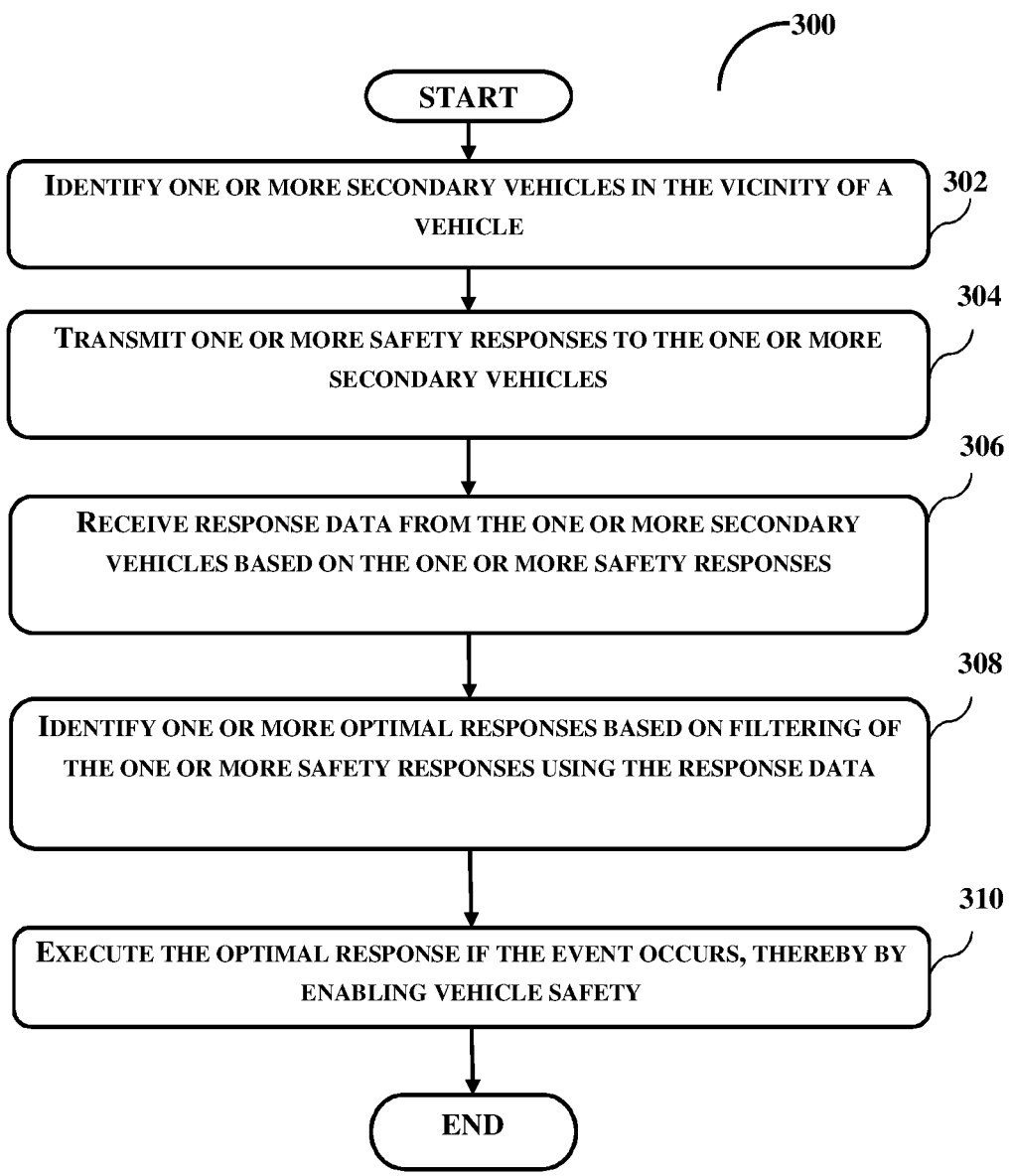
FIG. 3 illustrates a method for enabling safety of a vehicle, in accordance with an embodiment of the present subject matter.

Referring now to FIG. 3, a method 300 for enabling safety of a vehicle using a system 102, is disclosed in accordance with an embodiment of the present subject matter. The method 300 for enabling safety of a vehicle using a system 102 may be described in the general context of device executable instructions. Generally, device executable instructions can include routines, programs, objects, components, data structures, procedures, modules, functions, and the like, that perform particular functions or implement particular abstract data types. The method 300 for enabling safety of a vehicle using a system 102 may also be practiced in a distributed computing environment where functions are performed by remote processing systems that are linked through a communications network. In a distributed computing environment, computer executable instructions may be located in both local and remote computer storage media, including memory storage systems.

The order in which the method 300 for enabling safety of a vehicle using a system 102 is described is not intended to be construed as a limitation, and any number of the described method blocks can be combined in any order to implement the method 300 or alternate methods. Additionally, individual blocks may be deleted from the method 300 without departing from the spirit and scope of the subject matter described herein. Furthermore, the method 300 can be implemented in any suitable hardware, software, firmware, or combination thereof. However, for ease of explanation, in the embodiments described below, the method 300 for enabling safety of a vehicle using a system 102 may be considered to be implemented in the above-described system 102.

At block 302, one or more secondary vehicles in the vicinity of a vehicle are identified. In one embodiment, the transmission module 214 may identify one or more secondary vehicles in the vicinity of a vehicle. Further, the transmission module 214 may store the identified data in the system data 226.

At block 304, the one or more safety responses are transmitted to the one or more secondary vehicles. In one example, the one or more safety response is indicative of a response by the vehicle on occurrence of an event. In one embodiment, the transmission module 214 may transmit one or more safety responses, and store the transmitted data in the system data 226.

At block 306, response data may be received from the one or more secondary vehicles based on the one or more safety responses. In one example, the response data comprises one of an OK response or a NOT OK response corresponding to each of the one or more safety response. In one embodiment, the identification module 216 may receive response data from the one or more secondary vehicles based on the one or more safety responses and store the response data in system data 226.

At block 308, one or more optimal responses are identified based on filtering of the one or more safety responses using the response data. In one embodiment, the identification module 216 may identify one or more optimal responses. Further, the identification module 216 may store the one or more optimal responses in the system data 226.

At block 310, the optimal response is executed if the event occurs, thereby enabling vehicle safety. In one implementation, the execution module 220 may execute the optimal response thereby enabling vehicle safety.

Although implementations for methods and systems for enabling safety of a vehicle have been described in language specific to features, system and/or methods, it is to be understood that the appended claims are not necessarily limited to the specific features or methods for enabling safety of a vehicle described. Rather, the specific features and methods are disclosed as examples of implementations for enabling safety of a vehicle.

I claim:

1. A method for enabling safety of a vehicle, the method comprising:
    identifying, by a processor, one or more secondary vehicles in the vicinity of a vehicle;
    transmitting, by the processor, one or more potential safety responses to the one or more secondary vehicles, wherein the one or more potential safety responses is indicative of a response by the vehicle on occurrence of a potential event;
    receiving, by the processor, response data from each of the secondary vehicle from the one or more secondary vehicles based on the one or more potential safety responses, wherein the response data comprises one of an OK response or a NOT OK response corresponding to each of the one or more potential safety responses;
identifying, by the processor, one or more optimal responses, wherein the one or more optimal responses are one of the one or more potential safety responses with a maximum number of the OK response or minimum number of the NOT OK response, the one or more potential safety responses with the OK response above a predefined threshold or the NOT OK response below a predefined threshold, wherein the identifying, comprises:
computing, by the processor, a total number of the OK response and the NOT OK response received for each of the one or more potential safety responses; and
filtering, by the processor, the one or more potential safety responses based on an execution probability;
executing, by the processor, the one or more optimal responses if the potential event actually occurs, thereby by enabling vehicle safety.

2. The method of claim 1, further comprising:
obtaining, by the processor, data from one or more devices, wherein the data comprises environmental data, vehicle data, passenger data, road data, and wherein the one or more devices comprises one or more of sensors and cameras;
forecasting, by the processor, a scenario involving an occurrence of the potential event based on the data; and
generating, by the processor, the one or more potential safety responses to the potential event.

3. The method of claim 2, further comprising
generating, by the processor, an execution probability associated with the one or more potential safety responses based on the data, wherein the execution probability is indicative of a likelihood that the one or more potential safety responses would be executed if the potential event actually occurs;
filtering, by the processor, the one or more potential safety responses based on the execution probability; and
transmitting, by the processors, the one or more filtered potential safety responses to the secondary vehicles.

4. The method of claim 1, further comprising:
receiving, by the processor, response data from the one or more secondary vehicles based on the one or more potential safety responses, wherein the response data comprises the OK response or the NOT OK response;
executing, by the processor, an adjustment of the vehicle based on the NOT OK response.

5. A system for enabling safety of a vehicle, the system comprising:
a memory; and
a processor coupled to the memory, wherein the processor is configured to:
identify one or more secondary vehicles in the vicinity of a vehicle;
transmit one or more potential safety responses to the one or more secondary vehicles, wherein the one or more potential safety responses is indicative of a response by the vehicle on occurrence of a potential event;
receive response data from each of the secondary vehicle from the one or more secondary vehicles based on the one or more potential safety responses, wherein the response data comprises one of an OK response or a NOT OK response corresponding to each of the one or more potential safety responses;
identify one or more optimal responses, wherein the one or more optimal responses are one of the one or more potential safety responses with a maximum number of the OK response or minimum number of the NOT OK response, the one or more potential safety responses with the OK response above a predefined threshold or the NOT OK response below a predefined threshold, wherein the identifying comprises:
computing a total number of the OK response and the NOT OK response received for each of the one or more potential safety responses; and
filtering the one or more potential safety responses based on an execution probability; and
execute the one or more optimal responses if the potential event actually occurs, thereby by enabling vehicle safety.

6. The system of claim 5, further comprising the processor arranged to:
obtain data from one or more devices, wherein the data comprises environmental data, vehicle data, passenger data, road data, and wherein the one or more devices comprises one or more of sensors and cameras;
forecast a scenario involving an occurrence of the potential event based on the data; and
generate the one or more potential safety responses to the potential event.

7. The system of claim 6, further comprising the processor arranged to:
generate an execution probability associated with the one or more potential safety responses based on the data, wherein the execution probability is indicative of a likelihood that the one or more potential safety responses would be executed if the potential event actually occurs;
filter the one or more potential safety responses based on the execution probability; and
transmit the one or more filtered potential safety responses to the secondary vehicles.

8. The system of claim 5, further comprising a processor arranged to:
receive response data from the one or more secondary vehicles based on the one or more potential safety responses, wherein the response data comprises the OK response or the NOT OK response; and
execute an adjustment of the vehicle based on the NOT OK response.

* * * * *